United States Patent
Otsubo et al.

(12)

(10) Patent No.: US 9,528,401 B2
(45) Date of Patent: Dec. 27, 2016

(54) VALVE TIMING CONTROLLER

(71) Applicants: DENSO CORPORATION, Kariya, Aichi-pref. (JP); NIPPON SOKEN, INC., Nishio, Aichi-pref. (JP)

(72) Inventors: Makoto Otsubo, Okazaki (JP); Taei Sugiura, Anjo (JP); Hiroki Takahashi, Okazaki (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 23 days.

(21) Appl. No.: 14/600,493

(22) Filed: Jan. 20, 2015

(65) Prior Publication Data
US 2015/0211392 A1 Jul. 30, 2015

(30) Foreign Application Priority Data

Jan. 29, 2014 (JP) .................................. 2014-14761

(51) Int. Cl.
*F16H 1/32* (2006.01)
*F01L 1/352* (2006.01)
*F16C 19/26* (2006.01)
*F16C 19/06* (2006.01)

(52) U.S. Cl.
CPC ............... *F01L 1/352* (2013.01); *F16C 19/26* (2013.01); *F16H 1/32* (2013.01); *F16C 19/06* (2013.01); *F16C 2361/61* (2013.01); *F16H 1/321* (2013.01); *F16H 2001/323* (2013.01); *F16H 2001/324* (2013.01); *F16H 2001/327* (2013.01)

(58) Field of Classification Search
CPC ............. F01L 1/352; F16H 1/32; F16H 1/321; F16H 2001/327; F16H 2001/323; F16H 2001/324; F16C 19/26; F16C 19/06
See application file for complete search history.

(56) References Cited

U.S. PATENT DOCUMENTS

| | | | |
|---|---|---|---|
| 2007/0202981 A1 | 8/2007 | Sugiura | |
| 2008/0083388 A1* | 4/2008 | Uehama | F01L 1/352 123/90.17 |
| 2009/0017952 A1* | 1/2009 | Sugiura | F01L 1/34 475/128 |
| 2011/0303171 A1* | 12/2011 | Oka | F01L 1/352 123/90.17 |

(Continued)

FOREIGN PATENT DOCUMENTS

| | | |
|---|---|---|
| JP | 4360426 | 8/2009 |
| JP | 4442574 | 1/2010 |

OTHER PUBLICATIONS

U.S. Appl. No. 14/302,874, filed Jun. 12, 2014.

*Primary Examiner* — Roger Pang
(74) *Attorney, Agent, or Firm* — Nixon & Vanderhye PC

(57) ABSTRACT

A planet bearing has a single row of spherical rolling elements between an outer wheel and an inner wheel. A planet gear is supported by the outer wheel from a radially inner side. A planet carrier supports the inner wheel from a radially inner side. An elastic component is interposed between the inner wheel and the planet carrier. A driving rotor or a driven rotor has a thrust bearing part that supports the planet gear from one side in the axial direction. The outer wheel is in contact with the spherical rolling element at a rolling contact point and defines a contact angle on the one side in the axial direction.

5 Claims, 8 Drawing Sheets

(56) References Cited

U.S. PATENT DOCUMENTS

| | | | |
|---|---|---|---|
| 2014/0123922 A1* | 5/2014 | Tadokoro | F01L 1/344 123/90.17 |
| 2014/0366824 A1 | 12/2014 | Sugiura | |
| 2015/0059674 A1* | 3/2015 | Washino | F01L 1/34409 123/90.17 |
| 2016/0017771 A1* | 1/2016 | Otsubo | F01L 1/352 123/90.17 |
| 2016/0024977 A1* | 1/2016 | Takahashi | F16H 1/32 123/90.15 |

* cited by examiner

VALVE TIMING CONTROLLER

CROSS REFERENCE TO RELATED APPLICATION

This application is based on Japanese Patent Application No. 2014-14761 filed on Jan. 29, 2014, the disclosure of which is incorporated herein by reference in its entirety.

TECHNICAL FIELD

The present disclosure relates to a valve timing controller.

BACKGROUND

A valve timing controller has a driving rotor rotating with a crankshaft and a driven rotor rotating with a camshaft, and controls a rotation phase of the driven rotor relative to the driving rotor using planet movement of a planet gear.

JP 4360426 B2 describes a valve timing controller in which a driving side external gear part and a driven side external gear part of a planet gear respectively mesh with a driving side internal gear part of a driving rotor and a driven side internal gear part of a driven rotor in the eccentric state. When the valve timing controller is applied to an internal combustion engine, a large drive ratio can be obtained while the valve timing controller is downsized. In JP 4360426 B2, the planet gear is supported by a planet carrier through a planet bearing, such that smooth planet movement is achieved. An elastic component is interposed between the planet carrier and the planet bearing, and produces a restoring force. The planet gear is biased by the restoring force through the bearing to the eccentric side relative to the driving rotor and the driven rotor. There is no backlash in an engagement portion at which the driving side internal gear part and the driving side external gear part mesh with each other, and there is no backlash in an engagement portion at which the driven side internal gear part and the driven side external gear part mesh with each other, such that abnormal noise and wear are restricted from being generated.

In JP 4360426 B2, the planet bearing has double rows of spherical rolling elements disposed between an outer wheel that supports the planet gear from a radially inner side and an inner wheel supported by the planet carrier from a radially inner side.

SUMMARY

It is an object of the present disclosure to provide a valve timing controller in which abnormal noise and wear are restricted from being generated while the valve timing controller is downsized.

According to an aspect of the present disclosure, a valve timing controller that controls valve timing of a valve opened and closed by a camshaft by torque transmitted from a crankshaft of an internal combustion engine includes a driving rotor, a driven rotor, a planet bearing, a planet gear, a planet carrier, and an elastic component. The driving rotor rotates with the crankshaft, and has a driving side internal gear part. The driven rotor rotates with the camshaft, and has a driven side internal gear part located adjacent to the driving side internal gear part in an axial direction. The planet bearing has a single row of spherical rolling elements arranged between an outer wheel and an inner wheel. The planet gear is located eccentric to the driving rotor and the driven rotor in a radial direction and supported by the outer wheel from an inner side in the radial direction. The plane gear has a driving side external gear part and a driven side external gear part having diameters different from each other and located adjacent to each other in the axial direction. The driving side external gear part and the driven side external gear part respectively mesh with the driving side internal gear part and the driven side internal gear part on the eccentric side and integrally have a planet movement such that a rotation phase of the driven rotor relative to the driving rotor is controlled. The planet carrier supports the inner wheel from an inner side in the radial direction and rotates in a revolving direction of the planet gear to cause the planet gear to have the planet movement. The elastic component is interposed between the inner wheel and the planet carrier to generate a restoring force that biases the planet gear to the eccentric side through the planet bearing. The driving rotor or the driven rotor has a thrust bearing part that supports the planet gear from one side in the axial direction. The outer wheel is in contact with the spherical rolling element at a rolling contact point and defines a contact angle on the one side in the axial direction. The driving side external gear part and the driving side internal gear part mesh with each other at a driving side engagement portion. The driven side internal gear part and the driven side external gear part mesh with each other at a driven side engagement portion. The rolling contact point between the outer wheel and the spherical rolling element is located between the driving side engagement portion and the driven side engagement portion in the axial direction.

Thus, the planet bearing can be downsized due to the single row structure where one row of spherical rolling elements is interposed between the outer wheel which supports the planet gear from a radially inner side and the inner wheel supported by the planet carrier from a radially inner side. Moreover, the planet gear is supported by the thrust bearing part of the driving rotor or the driven rotor from one side in the axial direction, so the planet gear is difficult to tilt relative to the axial direction. Furthermore, the outer wheel is in contact with the spherical rolling element with a contact angle on the one side, on which the planet gear is supported by the thrust bearing part, in the axial direction. Therefore, the planet gear supported by the outer wheel is pressed against the thrust bearing part by receiving the thrust force in the axial direction. Accordingly, the planet gear becomes more difficult to tilt and is stably positioned with the fixed orientation.

Furthermore, the rolling contact point at which the outer wheel and the spherical rolling element is in contact with each other is located between the driving side engagement portion and the driven side engagement portion in the axial direction. Therefore, the restoring force transmitted from the elastic component is certainly distributed to both the engagement portions. As the result, the radial force applied to each engagement portion in the radial direction can correspond to the radial force inputted into each engagement portion by the cam torque transmitted from the camshaft to the driven rotor. Therefore, the radial force inputted by the cam torque can be cancelled by the radial force of the restoring force distributed to each engagement portion. Accordingly, the force balance in each engagement portion can be restricted from changing when the cam torque is fluctuated, and the posture of the planet gear is restricted from tilting.

Thus, abnormal noise and wear caused by a tilting in the posture of the planet gear can be restricted while the valve timing controller is downsized.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
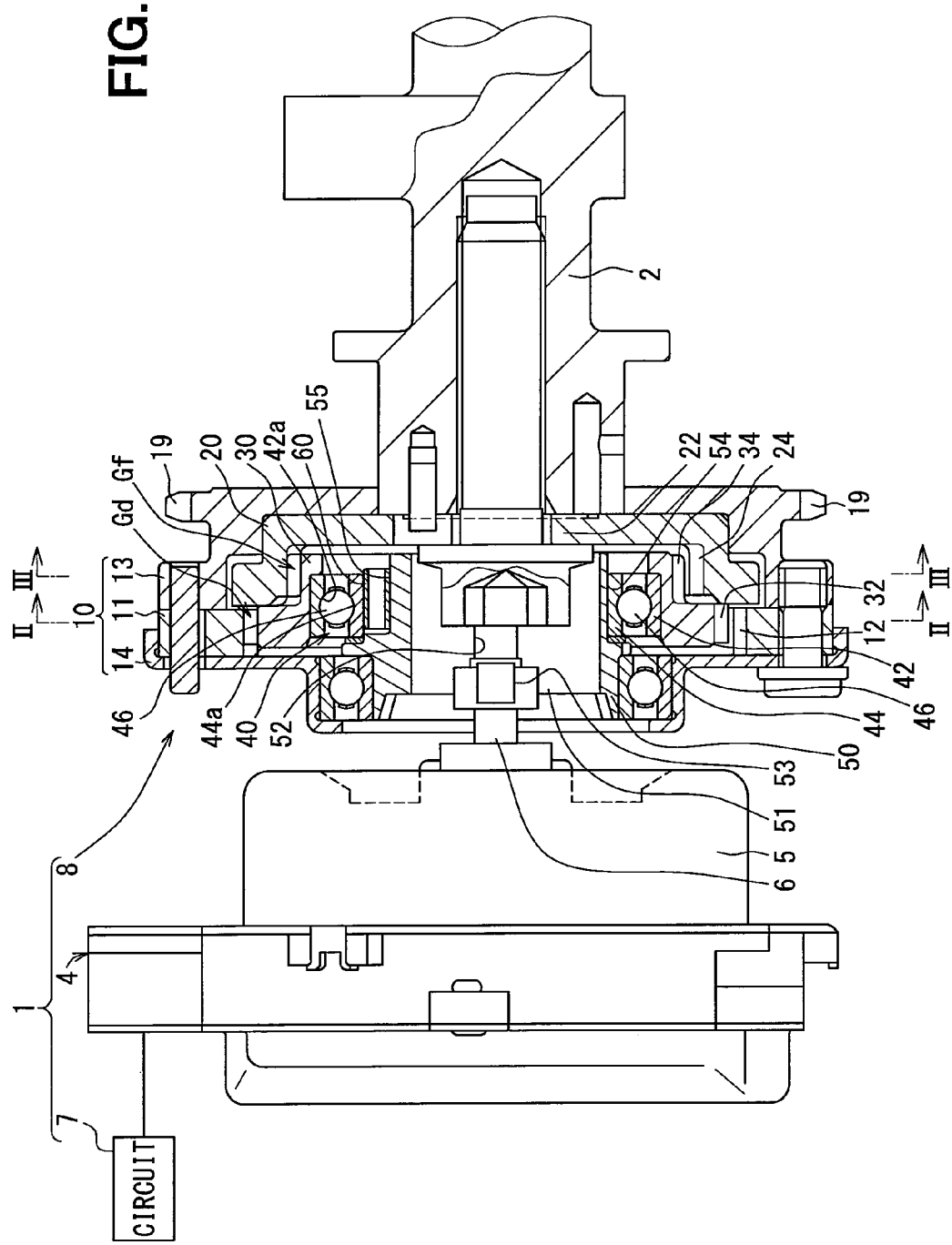
FIG. 1 is a schematic sectional view illustrating a valve timing controller according to an embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

An embodiment is described based on drawings.

Figure 2:
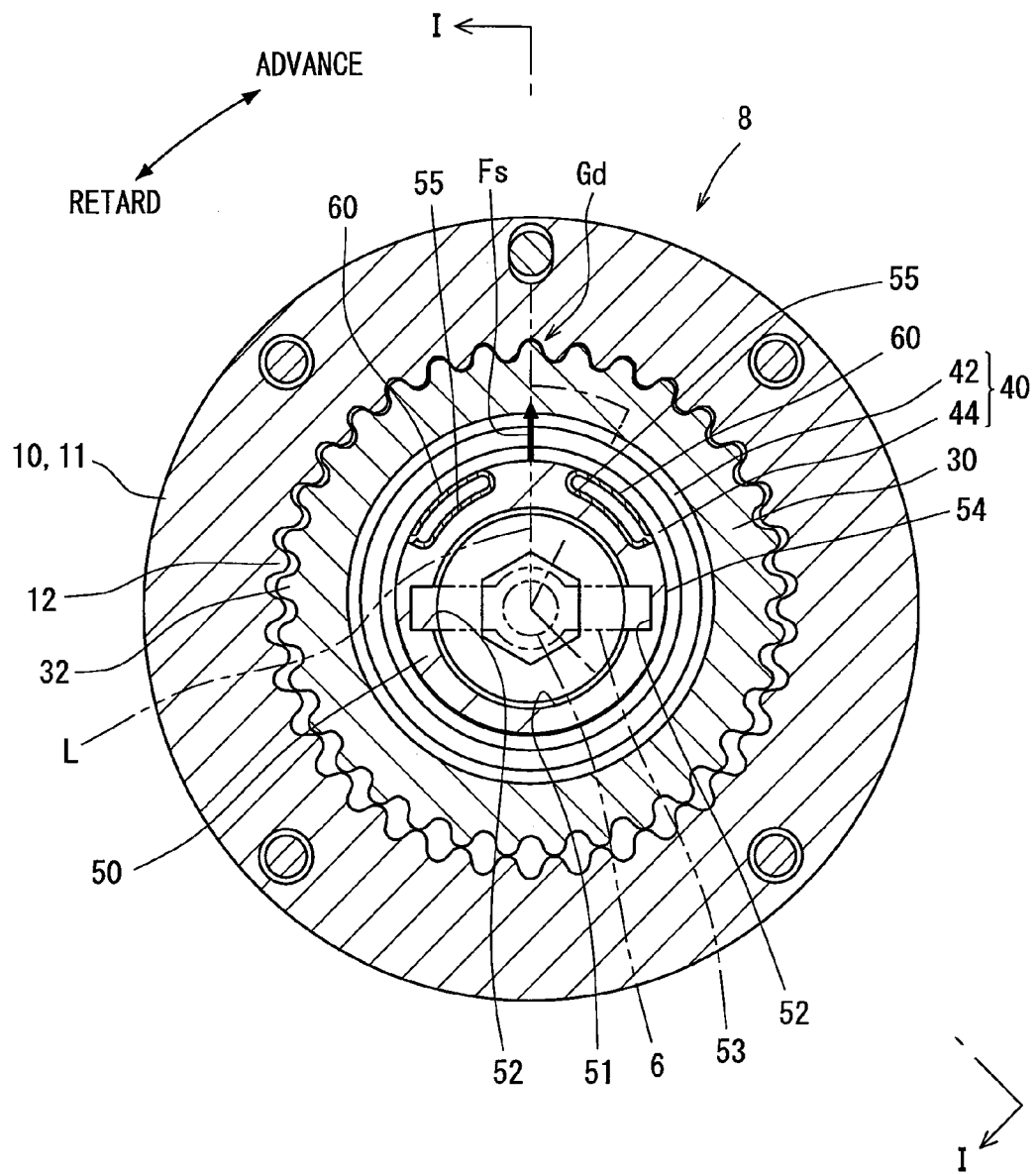
FIG. 2 is a cross-sectional view taken along a line II-II of FIG. 1.

As shown in FIG. 1 that includes a cross-sectional view taken along a line I-I of FIG. 2, a valve timing controller 1 according to the embodiment is attached to a power train system in which a crank torque is transmitted to a camshaft 2 from a crankshaft (not shown) in an internal combustion engine of a vehicle. The camshaft 2 opens and closes an intake valve (not shown) of the engine by the transmitted crank torque, such that the valve timing controller 1 controls the valve timing of the intake valve.

Figure 3:
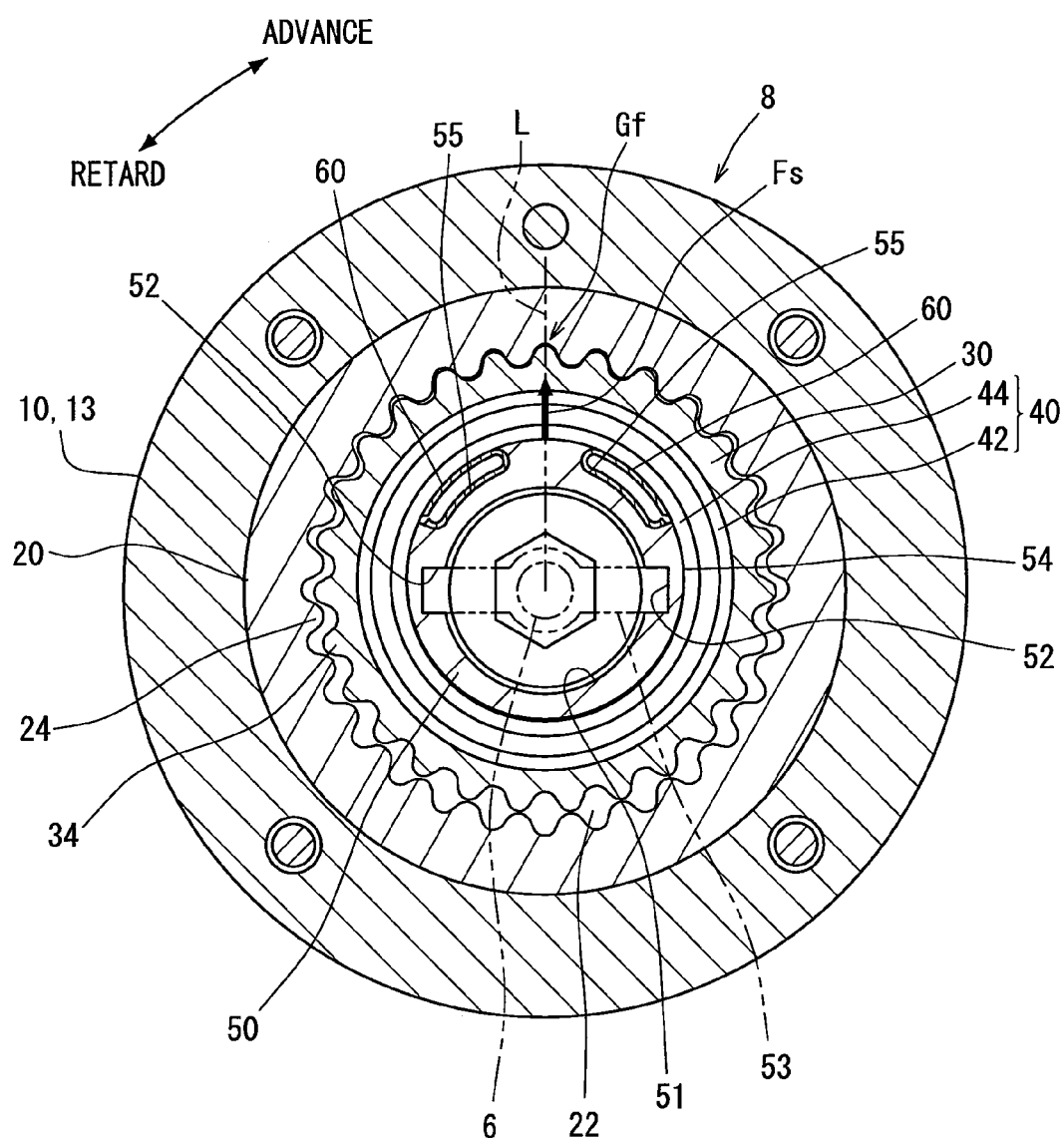
FIG. 3 is a cross-sectional view taken along a line III-III of FIG. 1.

As shown in FIGS. 1-3, the valve timing controller 1 includes an actuator 4, an energization control circuit unit 7, and a phase control unit 8.

The actuator 4 shown in FIG. 1 is an electric motor such as brushless motor, and has a housing body 5 and a control shaft 6. The housing body 5 is fixed to a fixed portion of the internal combustion engine, and supports the control shaft 6 in rotatable state. The energization control circuit unit 7 has a driver, and a microcomputer for controlling the driver. The energization control circuit unit 7 is arranged outside and/or inside the housing body 5. The energization control circuit unit 7 is electrically connected to the actuator 4 and controls the energization, such that the control shaft 6 is driven to rotate.

As shown in FIGS. 1-3, the phase control unit 8 includes a driving rotor 10, a driven rotor 20, a planet gear 30, a planet bearing 40, a planet carrier 50, and an elastic component 60.

The driving rotor 10 is made of metal, and has a hollow structure. The driven rotor 20, the planet gear 30, the planet bearing 40, the planet carrier 50, and the elastic component 60 are arranged in the driving rotor 10. The driving rotor 10 has a sprocket component 13, a cover component 14 and a sun-gear component 11 interposed between the sprocket component 13 and the cover component 14. The sun-gear component 11 has a ring board shape. The sprocket component 13 has a based cylinder shape, and the cover component 14 has a stepped cylinder shape. The sun-gear component 11, the sprocket component 13 and the cover component 14 are tightened together.

As shown in FIGS. 1 and 2, the sun-gear component 11 has a driving side internal gear part 12 on the inner circumference surface of a peripheral wall part, and an addendum circle is located on the inner side of a root circle in the radial direction. As shown in FIG. 1, the sprocket component 13 has plural sprocket teeth 19 on the outer circumference surface of a peripheral wall part, and the sprocket teeth 19 are projected outward in the radial direction at positions arranged in a circumferential direction with a regular interval. A timing chain (not shown) is engaged with the sprocket teeth 19 and sprocket teeth of the crankshaft, such that the sprocket component 13 is coordinated with the crankshaft. When the crank torque outputted from the crankshaft is transmitted to the sprocket component 13 through the timing chain, the driving rotor 10 is rotated with the crankshaft in a fixed direction (clockwise in FIGS. 2 and 3).

As shown in FIGS. 1 and 3, the driven rotor 20 is arranged on the inner side of the sprocket component 13 in the radial direction. The driven rotor 20 is made of metal, and has a based cylinder shape. The driven rotor 20 is coaxially fitted into the sprocket component 13, thereby supporting the driving rotor 10 from the inner side in the radial direction. The driven rotor 20 is arranged between the sun-gear component 11 and the sprocket component 13 in the axial direction. The bottom wall part of the driven rotor 20 has a connection part 22 coaxially connected with the camshaft 2. The driven rotor 20 is rotated in the same direction (clockwise in FIG. 3) as the driving rotor 10, and is able to rotate relative to the driving rotor 10.

The driven rotor 20 has a driven side internal gear part 24 on the inner circumference surface of a peripheral wall part, and an addendum circle is located on the inner side of a root circle in the radial direction. The driven side internal gear part 24 is arranged between the driving side internal gear part 12 and the camshaft 2 in the axial direction, and is located at a position not overlapping with the driving side internal gear part 12 in the radial direction. The inside diameter of the driven side internal gear part 24 is set smaller than the inside diameter of the driving side internal gear part 12. The number of teeth of the driven side internal gear part 24 is set less than the number of teeth of the driving side internal gear part 12.

As shown in FIGS. 1-3, the planet gear 30 is arranged from the radially inner side of the peripheral wall part of the driven rotor 20 to the radially inner side of the sun-gear component 11. The planet gear 30 is made of metal, and has a stepped cylinder shape. The planet gear 30 is located eccentric to the rotors 10 and 20 in the radial direction. The planet gear 30 has a driving side external gear part 32 and a driven side external gear part 34 on the outer circumference surface of a peripheral wall part, and an addendum circle is located on an outer side of a root circle in the radial direction. The driving side external gear part 32 meshes with the driving side internal gear part 12 on the eccentric side on which the planet gear 30 is eccentric to the rotors 10 and 20.

The driving side external gear part 32 and the driving side internal gear part 12 mesh with each other at a driving side engagement portion Gd.

The driven side external gear part 34 is located between the driving side external gear part 32 and the camshaft 2 in the axial direction, and is located at a position not overlapping with the driving side external gear part 32 in the radial direction. The outside diameter of the driven side external gear part 34 is different from that of the driving side external gear part 32, e.g., smaller than the outside diameter of the driving side external gear part 32. The number of teeth of the driven side external gear part 34 is set less than the number of teeth of the driving side external gear part 32. The driven side external gear part 34 meshes with the driven side internal gear part 24 on the eccentric side. The driven side external gear part 34 and the driven side internal gear part 24 mesh with each other at a driven side engagement portion Gf.

The planet bearing 40 made of metal is arranged from the radially inner side of the driving side external gear part 32 to the radially inner side of the driven side external gear part 34. The planet bearing 40 is eccentric to the rotors 10 and 20 in the radial direction. The planet bearing 40 is a single-row radial bearing in which plural spherical rolling elements 46 are arranged in one row between the outer wheel 42 and the inner wheel 44. In this embodiment, the planet bearing 40 is a single-row deep groove ball bearing. The outer wheel 42 is coaxially press-fitted into the planet gear 30, thereby supporting the gear 30 from the radially inner side.

The outer wheel 42 has an outer raceway groove 42a that is a circular groove recessed outward in the radial direction and that continuously extends in the circumferential direction. The outer raceway groove 42a has an arc shape in the cross-section that is symmetrical in the axial direction. The inner wheel 44 has an inner raceway groove 44a that is a circular groove recessed inward in the radial direction and that continuously extends in the circumferential direction. The inner raceway groove 44a has an arc shape in the cross-section that is symmetrical in the axial direction. Each of the spherical rolling elements 46 is arranged between the outer raceway groove 42a and the inner raceway groove 44a in the rolling contact state relative to the perimeter surface.

The planet carrier 50 is made of metal, and has a cylinder shape that is partially eccentric. The planet carrier 50 is arranged from the radially inner side of the inner wheel 44 to the radially inner side of the cover component 14. The planet carrier 50 has an input unit 51 on the inner circumference surface of a peripheral wall part. The input unit 51 has a cylindrical surface that has a same axis as the rotors 10 and 20 and the control shaft 6. The input unit 51 has a connection slot 52 fitted with a joint 53, and the control shaft 6 is connected with the planet carrier 50 through the joint 53. The planet carrier 50 rotates integrally with the control shaft 6, and is able to rotate relative to the driving side internal gear part 12.

The planet carrier 50 has an eccentric part 54 on the outer circumference surface of a peripheral wall part. The eccentric part 54 has a cylindrical surface eccentric to the rotors 10 and 20. The eccentric part 54 supports the inner wheel 44 that is coaxially fitted (on the outer side), from the radially inner side. Under this situation, the external gear part 32, 34 of the planet gear 30 supported by the planet carrier 50 through the planet bearing 40 is able to integrally have planet movement by changing the engage portion Gd, Gf according to the relative rotation of the planet carrier 50 relative to the driving side internal gear part 12. The planet movement means a movement in which the planet carrier 50 revolves (around the sun) in the revolving direction while the planet gear 30 rotates in the own circumferential direction. In other words, the planet carrier 50 is able to rotate in the revolving direction of the planet gear 30.

The elastic component 60 made of metal is received in a recess portion 55 opened at two positions in the circumferential direction of the eccentric part 54. Each elastic component 60 is a board spring having U-shaped cross-section. Each elastic component 60 is interposed between the inner wheel 44 (radially outer side) and the recess portion 55, and is compressed in the radial direction of the planet gear 30 and the planet bearing 40, such that the elastic component 60 is elastically deformed. As shown in FIGS. 2 and 3, when a radial direction line L is defined along the radial direction to which the planet gear 30 and the planet bearing 40 are eccentric to the rotors 10 and 20, the elastic components 60 are arranged at the symmetry position about the line L in an arbitrary range with an axial direction length. The total force Fs of the restoring forces generated by the elastic components 60 acts on the inner wheel 44 toward the eccentric side along the radial direction line L. As a result, the planet gear 30 is biased to the eccentric side through the planet bearing 40.

The phase control unit 8 controls the rotation phase of the driven rotor 20 relative to the driving rotor 10 according to the rotation state of the control shaft 6, such that a suitable valve timing control is realized depending on the operational situation of the internal combustion engine.

Specifically, the control shaft 6 rotates with the same speed as the driving rotor 10. When the planet carrier 50 is not rotated relative to the driving side internal gear part 12, the external gear parts 32 and 34 of the planet gear 30 rotate with the rotors 10 and 20 without carrying out planet movement. As a result, the rotation phase is substantially not changed, and the valve timing is maintained.

When the control shaft 6 rotates with low speed or rotates in an opposite direction relative to the driving rotor 10, the planet carrier 50 rotates in the retard direction relative to the driving side internal gear part 12, and the driven rotor 20 rotates in the retard direction relative to the driving rotor 10, due to the planet movement of the external gear parts 32 and 34. As a result, the rotation phase is retarded, such that the valve timing is retarded.

When the control shaft 6 rotates with higher speed than the driving rotor 10, the planet carrier 50 rotates in the advance direction relative to the driving side internal gear part 12, and the driven rotor 20 is rotated in the advance direction relative to the driving rotor 10, due to the planet movement of the external gear parts 32 and 34. As a result, the rotation phase is advanced, such that the valve timing is advanced.

Details of the phase control unit 8 are explained.

Figure 4:
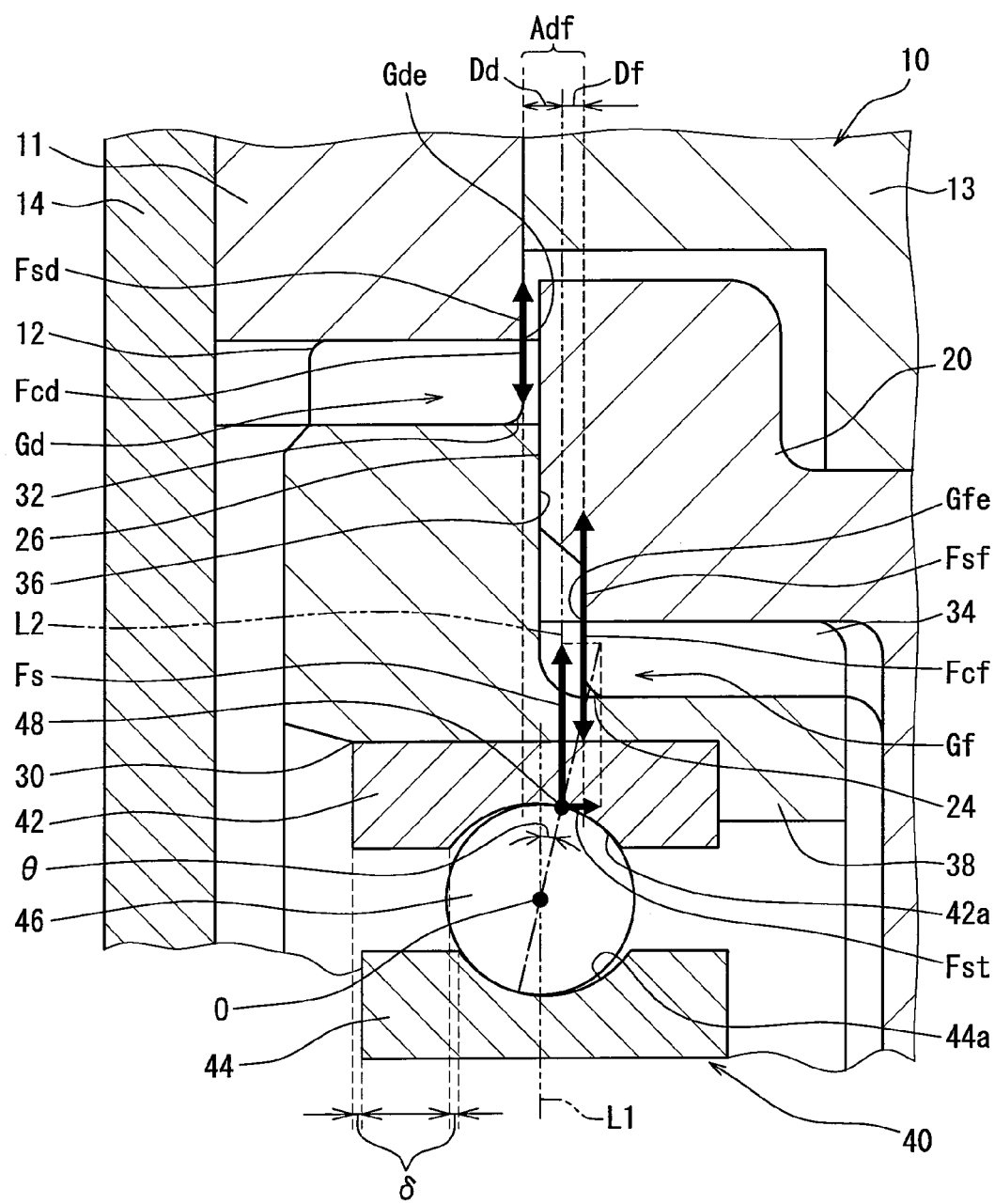
FIG. 4 is an enlarged view of FIG. 1 for explaining a radial force balance and a thrust force in a phase control unit of the valve timing controller.

As shown in FIG. 4, the driven rotor 20 has the thrust bearing part 26 that is defined by the axial end surface of the peripheral wall part, on the opening side. The thrust bearing part 26 has the ring plate shape. The planet gear 30 includes a connecting portion 36 having the ring plate shape. The connecting portion 36 connects the external gear parts 32 and 34 to each other in the radial direction. The thrust bearing part 26 slides in contact with the connecting portion 36 in the axial direction, such that the thrust bearing part 26 supports the planet gear 30 from the camshaft side as "one side" in the axial direction.

The outer raceway groove 42a and the inner raceway groove 44a of the planet bearing 40 are located offset from each other in the axial direction in an area where the outer raceway groove 42a and the inner raceway groove 44a are partially overlap with each other in the radial direction. The outer wheel 42 and the inner wheel 44 have the substantially the same length in the axial direction. The outer wheel 42 has the raceway groove 42a at the central part in the axial direction. The inner wheel 44 has the raceway groove 44a at the central part in the axial direction.

When the outer wheel 42 and the inner wheel 44 are arranged offset from each other by a predetermined dimension δ in the axial direction, for example, by flash ground processing, the raceway grooves 42a and 44a are also offset from each other in the axial direction by substantially same dimension as the predetermined dimension δ. Thus, as shown in FIG. 4, the outer raceway groove 42a and the spherical rolling element 46 are in contact with each other at a rolling contact point 48, and define a contact angle θ on the camshaft side in the axial direction relative to the radial direction line L1 that passes the center point O of the spherical rolling element 46 and that extends in the radial direction.

The rolling contact point 48 is unable to overlap with the internal gear parts 12 and 24 in the radial direction. In this embodiment, as shown in FIG. 4, the driven side external gear part 34 exists on the radial direction line L2 that passes the rolling contact point 48 and that extends in the radial direction. The other gear parts 12, 24, and 32 do not exist on the radial direction line L2. That is, at least the internal gear parts 12 and 24 do not exist on the radial direction line L2.

The rolling contact point 48 is located between an end Gde of the driving side engagement portion Gd adjacent to the gear part 24, 34 and an end Gfe of the driven side engagement portion Gf adjacent to the gear part 12, 32 in the axial direction. That is, the rolling contact point 48 is positioned in a range Adf between the driving side engagement portion Gd and the driven side engagement portion Gf in the axial direction.

Furthermore, the planet gear 30 has an inner flange part 38 having the ring plate shape, and the inner flange part 38 is projected inward in the radial direction from the driven side external gear part 34. The inner flange part 38 supports the outer wheel 42 from the camshaft side in the axial direction, in an area between the camshaft 2 and the rolling contact point 48 in the axial direction.

The radial force balance in the phase control unit 8 is explained.

As shown in FIG. 4, the restoring force Fs is totally transmitted from the elastic components 60 to the planet gear 30, on the eccentric side, through the rolling contact point 48 in the planet bearing 40, and is distributed to the engagement portions Gd and Gf. The axial direction distance Dd is defined between the end Gde of the driving side engagement portion Gd and the rolling contact point 48 in the axial direction. The axial direction distance Df is defined between the end Gfe of the driven side engagement portion Gf and the rolling contact point 48 in the axial direction.

When the restoring force Fs is transmitted, the radial force Fsd is distributed to the engagement portion Gd, on the eccentric side, according to the axial direction distances Dd, Df from the rolling contact point 48, and the radial force Fsf is distributed to the engagement portion Gf, on the eccentric side, according to the axial direction distances Dd, Df from the rolling contact point 48. Specifically, the radial force Fsd distributed according to the following formula 1 acts on the driving side engagement portion Gd, and the radial force Fsf distributed according to the following formula 2 acts on the driven side engagement portion Gf.

$$Fsd = Fs \cdot Df/(Dd+Df) \quad \text{(formula 1)}$$

$$Fsf = Fs \cdot Dd/(Dd+Df) \quad \text{(formula 2)}$$

Figure 5:
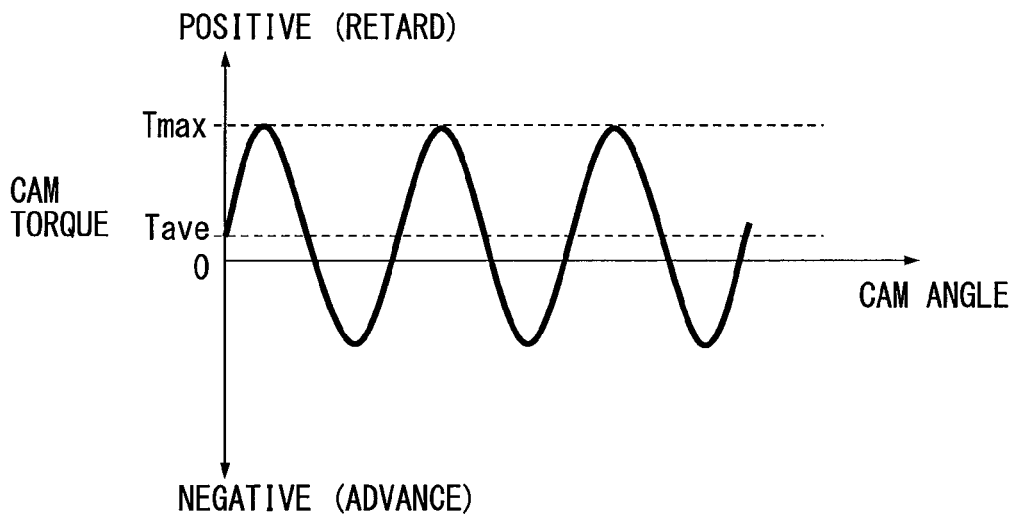
FIG. 5 is a graph of a cam torque transmitted to a camshaft.

As shown in FIG. 5, a cam torque is transmitted from the camshaft 2 to the driven rotor 20 rotating with the camshaft 2 during rotation of the engine, due to the reaction force of spring in an intake valve. The cam torque fluctuates between the negative torque applied in the advance direction of the driven rotor 20 to the driving rotor 10 and the positive torque applied in the retard direction of the driven rotor 20 to the driving rotor 10. In this embodiment, the cam torque has an average torque Tave which is calculated by averaging the positive torque and the negative torque, and the average torque Tave is shifted on the positive torque side (in the retard direction) due to the friction between the camshaft 2 and its bearing. Therefore, the maximum cam torque Tmax is set as the maximum value of the positive torque shown in FIG. 5.

When the cam torque is transmitted to the driven rotor 20 from the camshaft 2, as shown in FIG. 4, the radial force Fcd acts on the engagement portion Gd against the radial force Fsd, on the opposite side opposite from the eccentric side, and the radial force Fcf acts on the engagement portion Gf against the radial force Fsf, on the opposite side opposite from the eccentric side.

Figure 6:
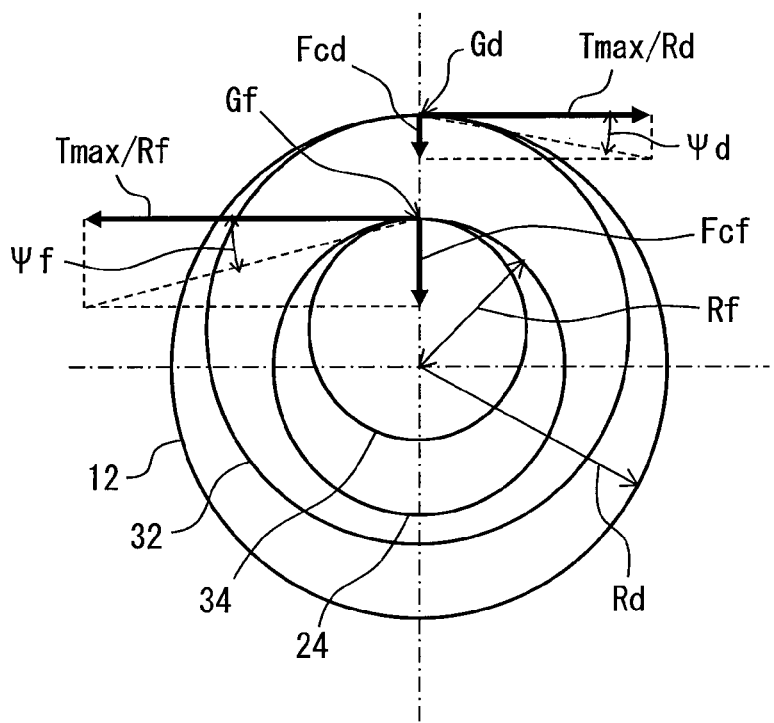
FIG. 6 is a diagram for explaining the radial force balance in the phase control unit.

As shown in FIG. 6, a pressure angle Ψd is defined between the driving side internal gear part 12 and the driving side external gear part 32 of the driving side engagement portion Gd, and a pressure angle Ψf is defined between the driven side internal gear part 24 and the driven side external gear part 34 of the driven side engagement portion Gf. The pitch circle of the driving side internal gear part 12 is set to have a radius Rd, and the pitch circle of the driven side internal gear part 24 is set to have a radius Rf.

When the maximum cam torque Tmax is transmitted, the radial force Fcd is inputted into the engagement portion Gd according to the pressure angle Ψd and the contact radius Rd, and the radial force Fcf is inputted into the engagement portion Gf according to the pressure angle Ψf and the contact radius Rf. Specifically, the radial force Fcd is inputted into the end Gde of the driving side engagement portion Gd according to the following formula 3, and the radial force Fcf is inputted into the end Gfe of the driven side engagement portion Gf according to the following formula 4.

$$Fcd = T\text{max} \cdot \tan(\Psi d)/Rd \quad \text{(formula 3)}$$

$$Fcf = T\text{max} \cdot \tan(\Psi f)/Rf \quad \text{(formula 4)}$$

As shown in FIG. 4, in order to restrict abnormal noise and wear caused by the gear rattle in the engagement portion Gd, Gf, it is necessary to set the radial force Fsd, Fsf generated by the transmitted restoring force Fs to be larger than the radial force Fcd, Fcf generated by the transmitted maximum cam torque Tmax.

Then, the position of the rolling contact point 48 is set between the engagement portions Gd and Gf in the axial direction to meet a relationship of Fcf≤Fsd in the driving side engagement portion Gd and to meet a relationship of Fcf≤Fsf in the driven side engagement portion Gf. That is, the axial direction distances Dd and Df are set to meet a force relationship of the following formula 5 and the following formula 6.

$$T\text{max} \cdot \tan(\Psi d)/Rd \leq Fs \cdot Df/(Dd+Df) \quad \text{(formula 5)}$$

$$T\text{max} \cdot \tan(\Psi f)/Rf \leq Fs \cdot Dd/(Dd+Df) \quad \text{(formula 6)}$$

If the rolling contact point 48 is positioned to overlap with the driven side engagement portion Gf in the radial direction, the axial direction distance Df has a negative value, and the formula 5 is no longer satisfied. In this case, it is difficult to restrict abnormal noise and wear. If the rolling contact point 48 is positioned to overlap with the driving side engagement portion Gd in the radial direction, the axial direction distance Dd has a negative value, and the formula 6 is no longer satisfied. In this case, it is difficult to restrict abnormal noise and wear.

Therefore, in order to restrict the abnormal noise and the wear, it is necessary to set the position of the rolling contact point 48 between the engagement portions Gd and Gf in the axial direction, where both the formula 5 and the formulas 6 are satisfied.

Figure 7:
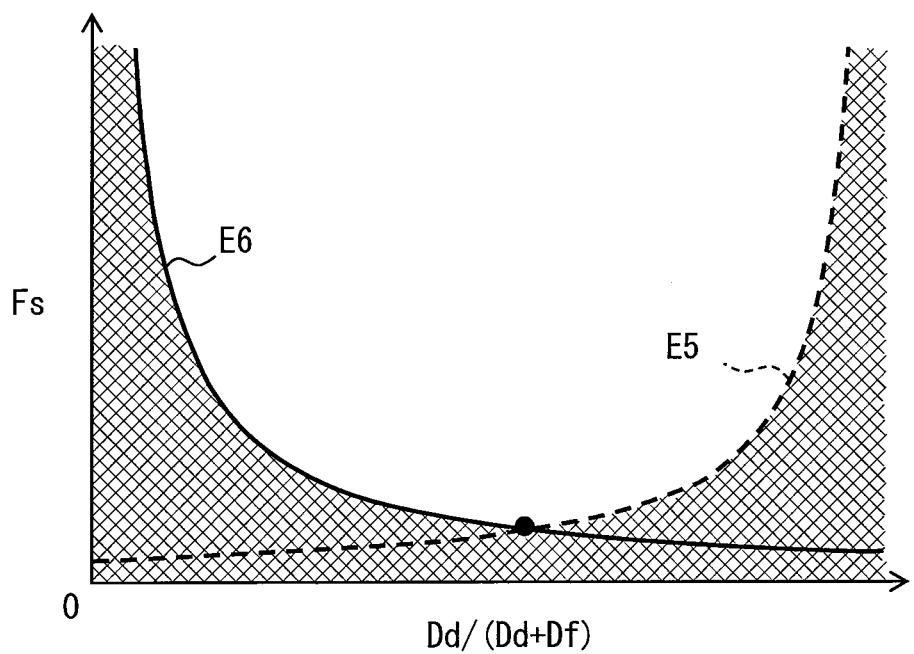
FIG. 7 is a characteristic graph for explaining the radial force balance in the phase control unit.

In FIG. 7, the value of Dd/(Dd+Df) is plotted on a horizontal axis and the value of the restoring force Fs is plotted on a vertical axis according to the formula 5 and the formula 6. A range in which both the formula 5 and the formula 6 are satisfied is shown by an area except a cross-hatching portion in FIG. 7. In FIG. 7, E5 represents the formula 5 and E6 represents the formula 6.

The boundary condition of a range in which the formula 5 is satisfied is obtained by the following formula 7 in which Fcd=Fsd in the force relationship of formula 5, as shown by a dashed line in the graph of FIG. 7.

The boundary condition of a range in which the formula 6 is satisfied is obtained by the following formula 8 in which Fcf=Fsf in the force relationship of formula 6, as shown by a solid line in the graph of FIG. 7.

The following formula 9 is obtained by solving the simultaneous equations of the formula 7 and the formula 8, and corresponds to a black dot in FIG. 7. According to the formula 9, an ideal value is calculated as a Dd/Df value which minimizes the restoring force Fs such that, for example, the elastic component 60 can be downsized.

An actual (design) value of the Dd/Df value which satisfies both the formula 5 and the formula 6 is set, relative to the ideal value of the Dd/Df value, within a tolerance (common difference) range such as ±25% in consideration of a tolerance of the Dd/Df value (for example, ±15%) and a tolerance of the restoring force Fs (for example, ±15%).

$$T\max \cdot \tan(\Psi d)/Rd = Fs \cdot Df/(Dd+Df) \quad \text{(formula 7)}$$

$$T\max \cdot \tan(\Psi f)/Rf = Fs \cdot Dd/(Dd+Df) \quad \text{(formula 8)}$$

$$Dd/Df = (\tan(\Psi f)/Rf)/(\tan(\Psi d)/Rd) \quad \text{(formula 9)}$$

Next, the thrust force applied in the phase adjustment unit 8 is explained.

As shown in FIG. 4, the thrust force Fst acts on the outer wheel 42 from the spherical rolling element 46 at the rolling contact point 48 on the side adjacent to the driven rotor 20 in the axial direction according to the following formula 10 based on the contact angle θ. As a result, in the planet gear 30 in which the thrust force Fst is transmitted to the inner flange part 38 from the outer wheel 42, the connecting portion 36 is forced onto the thrust bearing part 26 in the axial direction.

$$Fst = Fs \cdot \tan(\theta) \quad \text{(formula 10)}$$

Advantages of the valve timing controller 1 are explained below.

The planet bearing 40 has the single row of the spherical rolling elements 46 disposed between the outer wheel 42 which supports the planet gear 30 from a radially inner side and the inner wheel 44 supported by the planet carrier 50 from a radially inner side. Therefore, the valve timing controller 1 can be downsized.

Moreover, the planet gear 30 is supported by the thrust bearing part 26 of the driven rotor 20 from the camshaft side in the axial direction, therefore, the planet gear 30 is difficult to tilt relative to the axial direction.

Furthermore, the outer wheel 42 is in the rolling contact with each spherical rolling element 46 by forming the contact angle θ on the camshaft side on which the planet gear 30 is supported by the thrust bearing part 26 in the axial direction, such that the planet gear 30 supported by the outer wheel 42 is pressed against the thrust bearing part 26 by receiving the thrust force in the axial direction. Thus, the planet gear 30 becomes more difficult to tilt, such that the posture is stabilized with the fixed orientation.

Furthermore, the rolling contact point 48 between the outer wheel 42 and the spherical rolling element 46 is located between the driving side engagement portion Gd and the driven side engagement portion Gf in the axial direction, such that the restoring force Fs transmitted from the elastic component 60 is certainly distributed to both the engagement portions Gd and Gf. As the result, the radial force Fsd, Fsf applied to the respective engagement portion Gd, Gf in the radial direction can correspond to the radial force Fcd, Fcf inputted into the respective engagement portion Gd, Gf by the cam torque transmitted to the driven rotor 20 from the camshaft 2. Therefore, at each of the engagement portions Gd and Gf, the radial force Fcd, Fcf inputted by the cam torque can be cancelled by the radial force Fsd, Fsf distributed from the restoring force Fs. Accordingly, the force balance in each engagement portion Gd, Gf is restricted from changing when the cam torque fluctuates, such that the posture of the planet gear 30 is restricted from tilting.

Thus, the valve timing controller 1 can be downsized, and abnormal noise and wear resulting from a tilting in the posture of the planet gear 30 can be restricted.

Moreover, in each engagement portion Gd, Gf, the radial force Fsd, Fsf caused by the restoring force Fs becomes larger than or equal to the radial force Fcd, Fcf caused by the cam torque. Therefore, the force balance can be maintained at each engagement portion Gd, Gf. When the maximum cam torque Tmax is transmitted, the radial force Fsd, Fsf becomes larger than or equal to the radial force Fcd, Fcf. Therefore, the force balance is continuously maintained at each engagement portion Gd, Gf irrespective of the fluctuation in the cam torque.

The rolling contact point 48 is positioned between the engagement portions Gd and Gf in the axial direction so as to meet the force relationship of Fcd≤Fsd and Fcf≤Fsf according to the formula 5 and the formula 6. The planet gear 30 becomes more difficult to tilt, and abnormal noise and wear are restricted with more reliability.

Furthermore, the radial force Fcd, Fcf caused by the cam torque is distributed according to the axial direction distance Dd, Df between the engagement portion Gd, Gf and the rolling contact point 48. The rolling contact point 48 is positioned between the engagement portions Gd, Gf in the axial direction such that the axial direction distances Dd, Df meet the force relationship of Fcd≤Fsd and Fcf≤Fsf. Therefore, the force balance can be properly adjusted at each engagement portion Gd, Gf. As a result, the planet gear becomes more difficult to tilt, and abnormal noise and wear are restricted with much more reliability.

The outer wheel 42 and the inner wheel 44 respectively have the outer raceway groove 42a and the inner raceway groove 44a, each of which having an arc shape in the cross-section. The outer raceway groove 42a and the inner raceway groove 44a are in contact with each spherical rolling element 46, and are located offset from each other in the axial direction. Therefore, the contact angle can be suitably secured on the side of the outer raceway groove 42a. As a result, since the planet gear 30 is certainly pushed against the thrust bearing part 26, the planet gear 30 becomes more difficult to tilt, and abnormal noise and wear are restricted with much more reliability.

The present application is not limited to the above embodiment, and may be modified in the scope of the present disclosure as defined by the appended claims.

Figure 8:
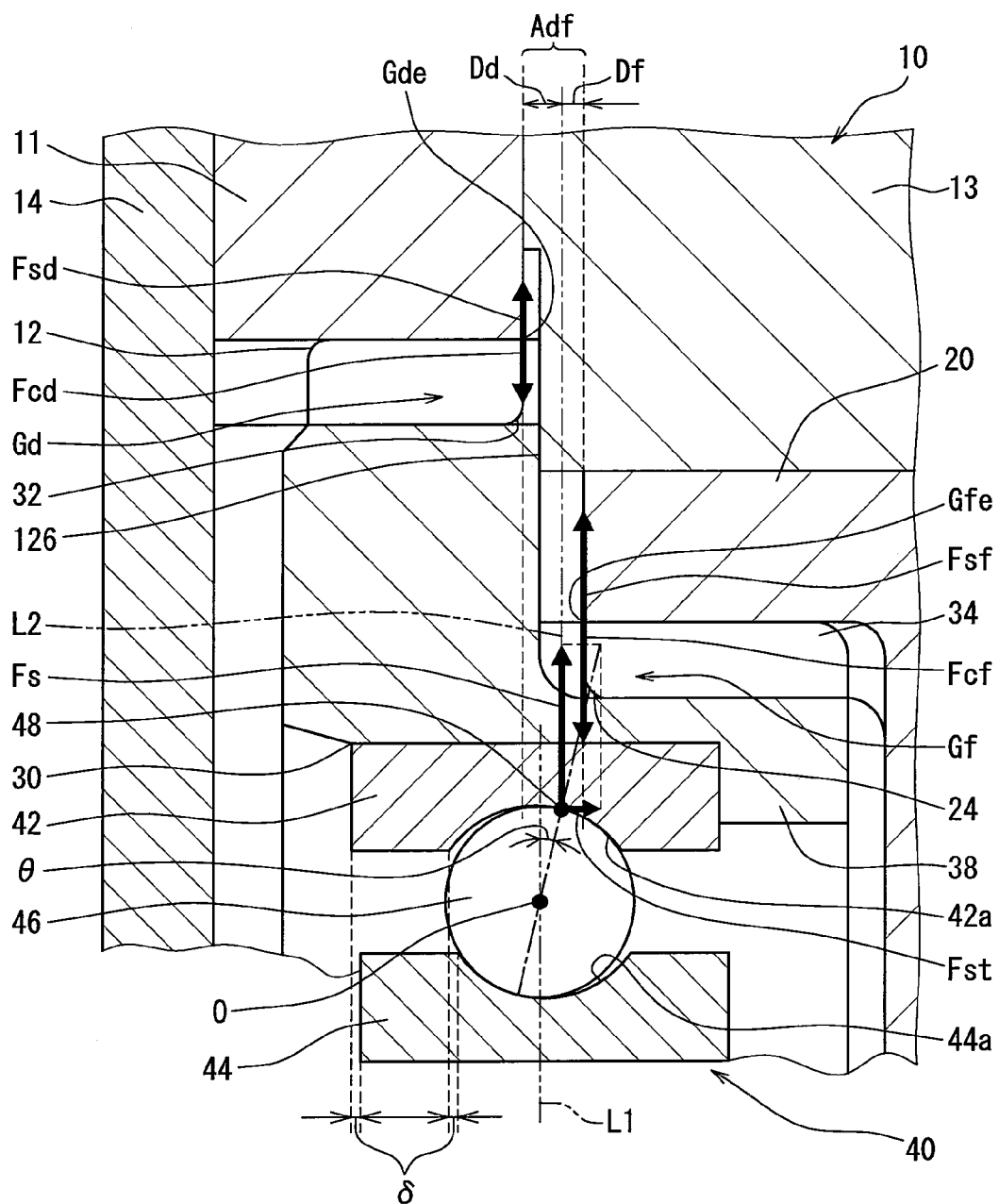
FIG. 8 is an enlarged cross-sectional view illustrating a modification in the valve timing controller.
Figure 9:
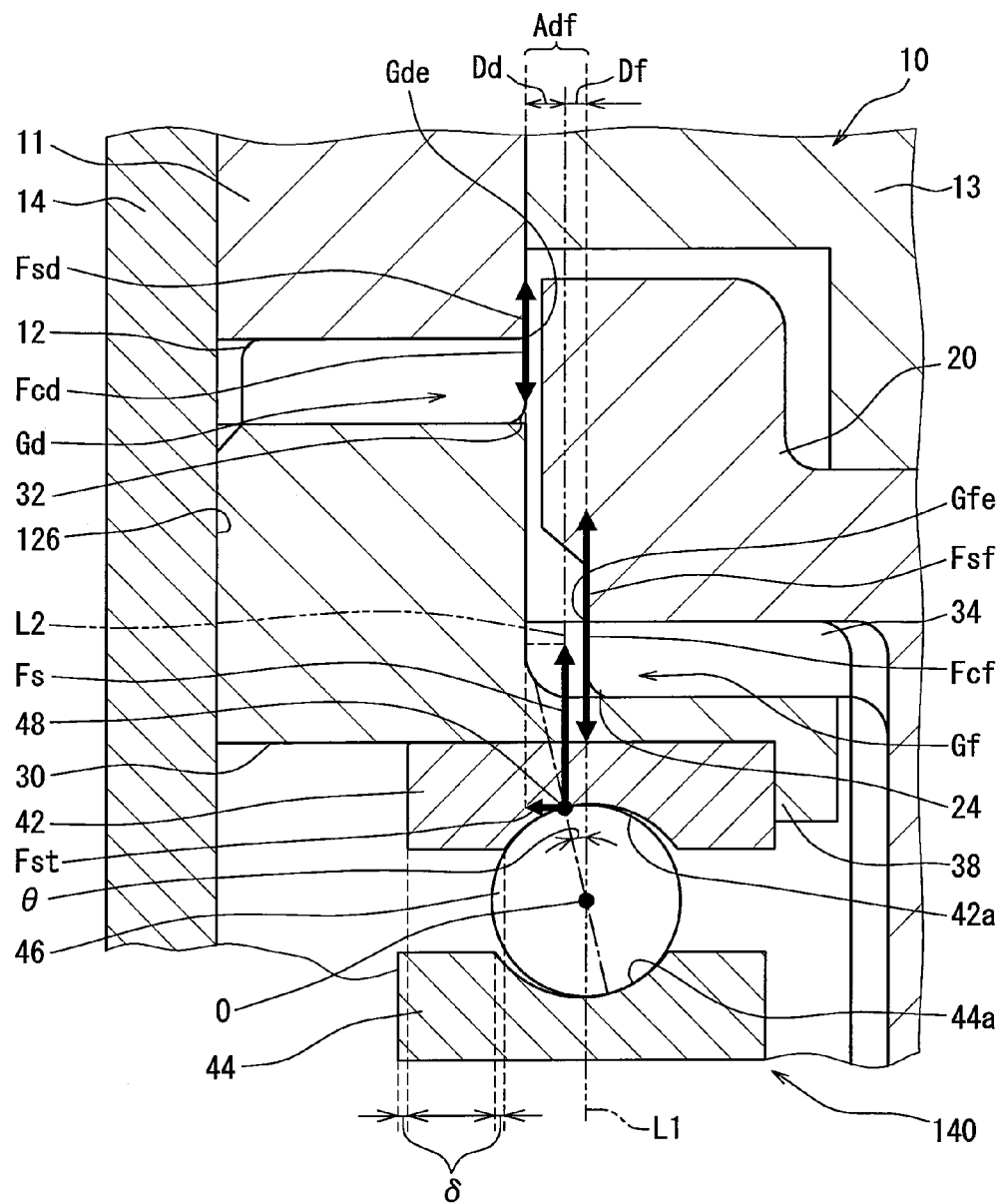
FIG. 9 is a an enlarged cross-sectional view illustrating a modification in the valve timing controller.

As shown in FIGS. 8 and 9, a thrust bearing part 126 which supports the planet gear 30 from "one side" in the axial direction is formed on the sprocket component 13 or the cover component 14 of the drive rotor 10.

In FIG. 8, the planet bearing 40 defines the contact angle θ on the camshaft side in the axial direction, and the thrust bearing part 126 supporting the planet gear 30 from the camshaft side is formed on the sprocket component 13.

In FIG. 9, the planet bearing 140 defines the contact angle θ on an opposite side away from the camshaft 2 in the axial direction, and the thrust bearing part 126 supporting the planet gear 30 from the opposite side is formed on the cover component 14.

The outer wheel 42 and the inner wheel 44 have substantially the same length in the axial direction, and may be placed at the same position (i.e., not offset from each other) in the axial direction. In this case, the planet bearing 40, 140 has a single-row deep groove ball bearing in which the raceway grooves 42a and 44a are located offset from the central part in the axial direction.

The single-row deep groove ball bearing of the planet bearing 40, 140 may be replaced with a single-row angular ball bearing, in which at least the outer raceway groove 42a that has an asymmetrical cross-sectional shape provides the contact angle θ in the axial direction.

The single-row deep groove ball bearing of the planet bearing 40, 140 may be replaced with a single-row four-point contact ball bearing, in which the raceway grooves 42a and 44a are located offset from each other in the axial direction. In this case, the four-point contact ball bearing, as the planet bearing 40, 140, is used substantially in the two-point contact state.

At least the external gear parts 32 and 34 may be placed not on the radial direction line L2 defined to pass the rolling contact point 48, such that the rolling contact point 48 is positioned between the driving side engagement portion Gd and the driven side engagement portion Gf in the axial direction.

The maximum cam torque Tmax of the formulas 3-8 in the above embodiment may be replaced with the average torque Tave that is smaller than the maximum cam torque Tmax. In this case, the force relationship of the formulas 5 and 6 is fulfilled on the average. The present disclosure may be applied to a valve timing controller which controls the valve timing of an exhaust valve. The present disclosure may be applied to a valve timing controller which controls the valve timing of both an intake valve and an exhaust valve.

Such changes and modifications are to be understood as being within the scope of the present disclosure as defined by the appended claims.

What is claimed is:

1. A valve timing controller that controls valve timing of a valve opened and closed by a camshaft by torque transmitted from a crankshaft of an internal combustion engine, the valve timing controller comprising:
    a driving rotor that rotates with the crankshaft, the driving rotor having a driving side internal gear part;
    a driven rotor that rotates with the camshaft, the driven rotor having a driven side internal gear part located adjacent to the driving side internal gear part in an axial direction;
    a planet bearing having a single row of spherical rolling elements arranged between an outer wheel and an inner wheel;
    a planet gear located eccentric to the driving rotor and the driven rotor in a radial direction and supported by the outer wheel from an inner side in the radial direction, the planet gear having a driving side external gear part and a driven side external gear part having diameters different from each other and located adjacent to each other in the axial direction, wherein the driving side external gear part and the driven side external gear part respectively mesh with the driving side internal gear part and the driven side internal gear part on the eccentric side and integrally have a planet movement such that a rotation phase of the driven rotor relative to the driving rotor is controlled;
    a planet carrier supporting the inner wheel from an inner side in the radial direction and rotating in a revolving direction of the planet gear to cause the planet gear to have the planet movement; and
    an elastic component interposed between the inner wheel and the planet carrier to generate a restoring force that biases the planet gear to the eccentric side through the planet bearing, wherein
    the driving rotor or the driven rotor has a thrust bearing part that supports the planet gear from one side in the axial direction,
    the outer wheel is in contact with the spherical rolling element at a rolling contact point and defines a contact angle on the one side in the axial direction,
    the rolling contact point is located between a driving side engagement portion at which the driving side external gear part and the driving side internal gear part mesh with each other and a driven side engagement portion at which the driven side internal gear part and the driven side external gear part mesh with each other in the axial direction,
    the outer wheel has an outer raceway groove in contract with the spherical rolling element,
    the inner wheel has an inner raceway groove in contract with the spherical rolling element, and
    the outer raceway groove and the inner raceway groove are located offset from each other in the axial direction.

2. The valve timing controller according to claim 1, wherein
    a radial force Fcd is inputted into the driving side engagement portion in the radial direction when a cam torque is transmitted to the driven rotor from the camshaft,
    a radial force Fsd is distributed to the driving side engagement portion in the radial direction when the restoring force is transmitted to the planet gear from the elastic component,
    a radial force Fcf is inputted into the driven side engagement portion when the cam torque is transmitted to the driven rotor from the camshaft,
    a radial force Fsf is distributed to the driven side engagement portion in the radial direction when the restoring force is transmitted to the planet gear from the elastic component, and
    the rolling contact point is positioned between the driving side engagement portion and the driven side engagement portion in the axial direction to meet a force relationship of Fcd<Fsd and Fcf<Fsf.

3. The valve timing controller according to claim 2, wherein the force relationship of Fcd<Fsd and Fcf<Fsf is met when the radial force Fcd is inputted into the driving side engagement portion in the radial direction by transmitting the maximum cam torque to the driven rotor from the camshaft and when the radial force Fcf is inputted into the driven side engagement portion by transmitting the maximum cam torque to the driven rotor from the camshaft.

4. The valve timing controller according to claim 2, wherein the rolling contact point is positioned between the driving side engagement portion and the driven side engagement portion in the axial direction such that an axial direction distance defined between the driving side engagement portion and the rolling contact point in the axial direction and an axial direction distance defined between the driven side engagement portion and the rolling contact point meet the force relationship of Fcd<Fsd and Fcf<Fsf.

5. A valve timing controller that controls valve timing of a valve opened and closed by a camshaft by torque transmitted from a crankshaft of an internal combustion engine, the valve timing controller comprising:

a driving rotor that rotates with the crankshaft, the driving rotor having a driving side internal gear part;

a driven rotor that rotates with the camshaft, the driven rotor having a driven side internal gear part located adjacent to the driving side internal gear part in an axial direction;

a planet bearing having a single row of spherical rolling elements arranged between an outer wheel and an inner wheel;

a planet gear located eccentric to the driving rotor and the driven rotor in a radial direction and supported by the outer wheel from an inner side in the radial direction, the planet gear having a driving side external gear part and a driven side external gear part having diameters different from each other and located adjacent to each other in the axial direction, wherein the driving side external gear part and the driven side external gear part respectively mesh with the driving side internal gear part and the driven side internal gear part on the eccentric side and integrally have a planet movement such that a rotation phase of the driven rotor relative to the driving rotor is controlled;

a planet carrier supporting the inner wheel from an inner side in the radial direction and rotating in a revolving direction of the planet gear to cause the planet gear to have the planet movement; and an elastic component interposed between the inner wheel and the planet carrier to generate a restoring force that biases the planet gear to the eccentric side through the planet bearing, wherein the driving rotor or the driven rotor has a thrust bearing part that supports the planet gear from one side in the axial direction, the outer wheel is in contact with the spherical rolling element at a rolling contact point and defines a contact angle on the one side in the axial direction, the rolling contact point is located between a driving side engagement portion at which the driving side external gear part and the driving side internal gear part mesh with each other and a driven side engagement portion at which the driven side internal gear part and the driven side external gear part mesh with each other in the axial direction, a radial force Fcd is inputted into the driving side engagement portion in the radial direction when a cam torque is transmitted to the driven rotor from the camshaft, a radial force Fsd is distributed to the driving side engagement portion in the radial direction when the restoring force is transmitted to the planet gear from the elastic component, a radial force Fcf is inputted into the driven side engagement portion when the cam torque is transmitted to the driven rotor from the camshaft, a radial force Fsf is distributed to the driven side engagement portion in the radial direction when the restoring force is transmitted to the planet gear from the elastic component, and the rolling contact point is positioned between the driving side engagement portion and the driven side engagement portion in the axial direction to meet a force relationship of Fcd<Fsd and Fcf<Fsf.

* * * * *